United States Patent
Holscher et al.

[11] Patent Number: 6,025,002
[45] Date of Patent: Feb. 15, 2000

[54] METHOD OF REMOVING OFF-NOTES FROM COCOA PRODUCTS

[75] Inventors: Wilhardi J. Holscher, Gr. Mackenstedt; Ute-Christine Konopka, Munich; Otto G. Vitzthum, Bremen; Siegfried Bolenz, Munich, all of Germany; Marie Caroline Grosso, Corcelles, Switzerland; Klaus D. Koch, Bremen, Germany

[73] Assignee: Kraft Foods, Inc., Northfield, Ill.

[21] Appl. No.: 08/852,464

[22] Filed: May 7, 1997

[30] Foreign Application Priority Data

May 10, 1996 [EP] European Pat. Off. ............. 96107471

[51] Int. Cl.[7] .................................................. A23L 1/00
[52] U.S. Cl. ........................................... 426/511; 426/631
[58] Field of Search ................................... 426/511, 634, 426/466, 631

[56] References Cited

U.S. PATENT DOCUMENTS

| | | | |
|---|---|---|---|
| 1,044,758 | 11/1912 | Dierbach | 426/660 |
| 3,904,777 | 9/1975 | Goerling et al. | 426/631 |
| 3,955,489 | 5/1976 | Goerling et al. | 99/485 |
| 4,707,365 | 11/1987 | Haynes et al. | 426/94 |
| 5,773,065 | 6/1998 | Clauzure | 426/511 |

FOREIGN PATENT DOCUMENTS

| | | |
|---|---|---|
| 0 001 850 | 5/1979 | European Pat. Off. . |
| 0 061 229 | 9/1982 | European Pat. Off. . |
| 0 068 221 | 1/1983 | European Pat. Off. . |
| 3 440 091 A1 | 5/1986 | Germany . |
| 3 803 180 | 11/1988 | Germany . |
| WO 95/07026 | 3/1995 | WIPO ................... 426/511 |

OTHER PUBLICATIONS

Research Disclosure 36332 published by Kenneth Mason Publications Ltd., Jul. 1994, No. 363.
M. Martens, et al. Flavour Defects of Cocoa, 1987. Flavour Science and Technology, p. 133.

*Primary Examiner*—George C. Yeung
*Attorney, Agent, or Firm*—Thomas A. Marcoux; Thomas R. Savoie

[57] ABSTRACT

A method for treating fermented cocoa beans to produce acid-reduced, roasted, de-shelled cocoa possessing a decreased level of 2-methoxy-3-isopropylpyrazine (MIPP). The method involves the treatment of cocoa beans with steam at a temperature within the range of from about 100° C. to about 140° C. for a period of time of from about 10 minutes to about 120 minutes.

10 Claims, 3 Drawing Sheets

METHOD OF REMOVING OFF-NOTES FROM COCOA PRODUCTS

TECHNICAL FIELD

This invention relates to a method of converting fermented cocoa beans to cocoa mass. It also relates to the use of such a method to achieve specific results, including the removal of off-flavour notes from the beans, thereby opening up the possibility to make good quality chocolate from beans having an off-flavour note. The invention also relates to cocoa mass obtainable by the process of the invention and chocolate made from such cocoa mass or by the method of the invention.

BACKGROUND ART

U.S. Pat. No. 2,558,854 describes how chocolate is obtained from cocoa pods, that is the fruit of *Theobroma cacoa*.

First quality chocolate does not have an off-flavour which has been described by various terms including mouldy, musty or earthy. Chocolate makers therefore cannot use, in the manufacture of top quality chocolate, any beans which might be responsible for such a flavour. They therefore specify only top quality beans.

Specifically, the consensus is that bean feedstocks with a mouldy bean content of anything more than 3% is unacceptable. The bean mould may be internal, external, or both. However, research work published in 1987 (Baigrie et al, Flavour Science and Technology, 1987, pp 133–141) indicates that many feedstocks with a high level of mould nevertheless do not produce chocolate with a mouldy flavour. Thus, it remains unclear which beans are suitable for making top quality chocolate, and which are not.

In his 1987 paper, Baigrie identified 2-methoxy-3-isopropylpyrazine, MIPP, as being the major contributor for the off-flavour, termed mouldy/musty or earthy/musty by flavourists. He further asserts that the off-flavor in poor quality cocoa beans may in fact have nothing to do with the actual presence or absence of mould in or on the beans.

Baigrie found that MIPP supresses chocolate flavour but that this effect was not confined to MIPP and that the flavour suppression mechanisms "are clearly complex".

That off flavours in cocoa beans can be removed by superheated steam is already known. See, for example, U.S. Pat. No. 4,861,615 in which a screw extruder receives raw cocoa bean fragments which are subject then to the action of high pressure steam before being mixed, kneaded and de-gassed. Roasting is effected in a third zone of the extruder by heat delivered through the extruder housing wall.

U.S. Pat. No. 2,278,483 (published Apr. 7, 1942) teaches that shells of cocoa beans can be loosened by subjecting the shells to the action of steam at substantial superheat and elevated pressure. As high a pressure as is practicable is advocated, with a sudden release of this pressure which has an explosive effect on the beans, for better separation of nibs from shells. An effect on flavour development is noted, if the treatment is continued longer than required for deshelling, but it is explained that this flavour development is achieved anyway, during the subsequent processing of the nibs. The reader is urged to select the highest feasible pressure, in order for the treatment time to be as short as possible, for economic reasons. Treatment times of from 5 to 50 seconds and from 5 to 120 seconds, are specified.

DD 98817 discloses adding water to cocoa mass and then heating the mass, in order that the consequent water evaporation improves the flavour of the cocoa assisting the efflux of flavour-spoiling constituents.

SU-A-1324626 discloses an apparatus for hydro-thermal treatment of cocoa beans, but the document is silent as to any details of the process conditions.

EP-A-0061229 discloses processing a wide range of materials including cereal grains and cocoa beans with heat and pressure. It is noted that it is customary to improve the organoleptic (taste, appearance, odour) characteristics of cereals by such techniques. Temperatures of at least 200° C. are advocated, together with high pressures, preferably in a range of 5–35 atmospheres, for periods of time such as 3–13 seconds. The treatment killed more than 99.9% of bacteria in two samples of cocoa beans.

EP-A-0068221 proposes treating cocoa beans in their shells by first dampening and then heat treatment at temperatures of at least 150° C. This facilitates subsequent separation of nibs from shells, and kills bacteria in the feedstock. The nibs are then roasted.

U.S. Pat. No. 4,970,090 discloses processes for improving and strengthening the flavour of water or ethanol cocoa extract by holding it at elevated temperature, greater than 125° C. but less than 150° C., for periods of time of from 3.5 to 4.5 hours.

The state of the art contains many disclosures of the use of steam in processes to reduce the bacterial content of raw cocoa beans. DE-A-3902679 provides a survey of the art and itself suggests the use of saturated steam at 0.6 Mpa (6 bar) and 160° C. for this purpose.

BRIEF SUMMARY OF THE INVENTION

It is an object of the present invention to provide an economical process for making chocolate from cocoa beans which maximises chocolate flavour and suppresses negative flavour notes. It is further the object of the invention to produce chocolate products of a given quality from cocoa bean feedstocks which would otherwise have been considered to be of inadequate quality.

BRIEF DESCRIPTION OF THE DRAWINGS

For a better understanding of the invention, and to show more clearly how the same may be carried into effect, reference will now be made, by way of example, to the accompanying drawings, in which.

DETAILED DESCRIPTION OF THE PRESENT INVENTION

Figure 1:
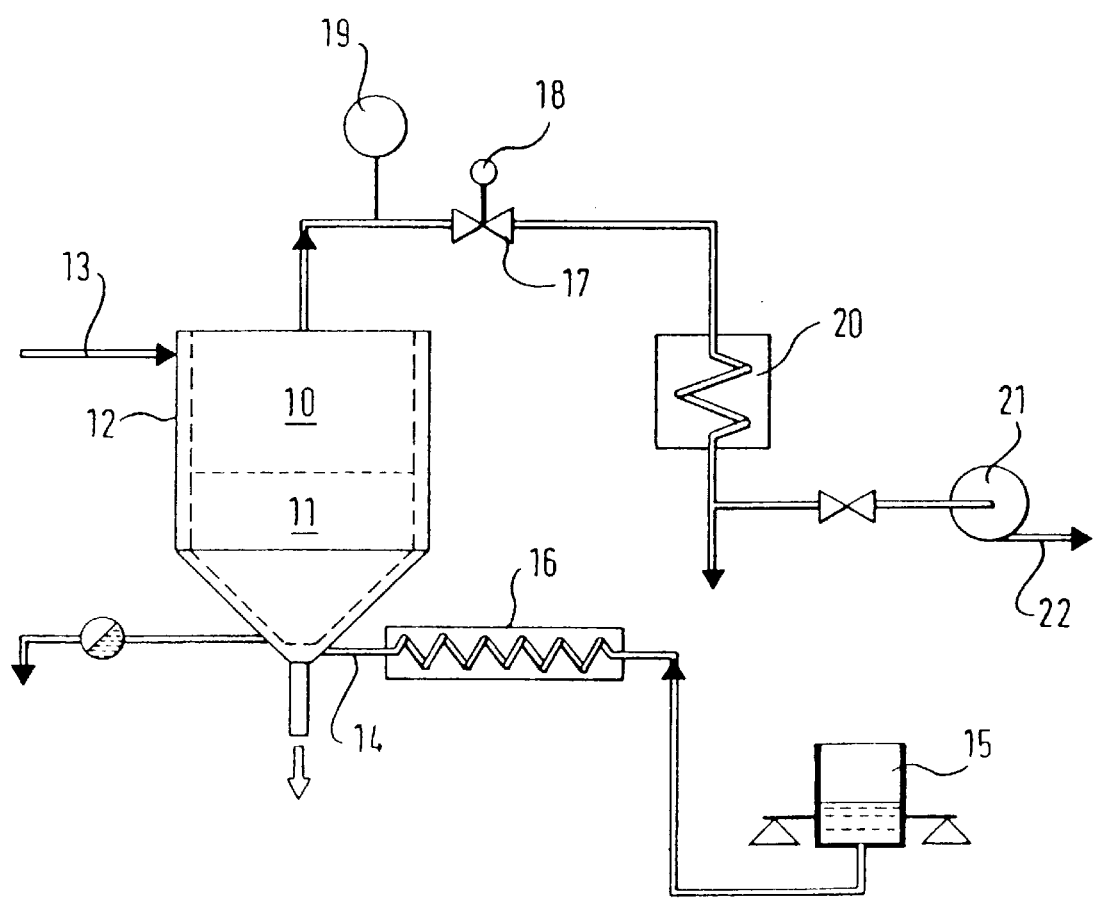
FIG. 1 is a achematic deagram of apparatus for steaming cocoa beans.

The present invention is achieved, in a method of converting fermented cocoa beans to cocoa mass, by the step of contacting the beans with an incident flow of steam, which is provided at a temperature which is in a range of from about 100° C. to about 140° C.

Preferably, the beans are steamed while still in their shells. This facilitates subsequent separation of the beans from the shells.

Preferably, the steaming treatment replaces the conventional roasting treatment. Thus, in one step, the beans are deshelled and roasted.

Preferably, the steaming is effected using saturated or substantially saturated steam (as in a classic steam distillation process). In this way, the beans receive enough steam and heat to "roast" the beans. The beans need no further roasting before being tasted. This is a valuable result of the present invention.

The treatment temperature is in a range of from 100 to 140° C., more preferably 100 to 130° C. and most preferably 100 to 110° C.

As to pressure, with saturated steam this would be fixed by the steam temperature. In any case, a pressure of 50 to 300 Kpa (0.5 to 3.0 bar) is preferred. Higher pressures may increase the likelihood of loss of desirable flavour notes and generation of negative notes.

A steam to bean ratio in a range of from 0.1–1.0/1.0 has been found to give good results, that is to say, adequate but not excessive, roasting. A steam to bean ratio of 0.4 to 1 is one preferred point in the range. The ratio referred to is that between the weight of steam absorbed by the beans plus condensate and the weight of the beans presented for steaming.

A steaming time of from 10 to 120 minutes is indicated, to be in accordance with the above constraints, in order to achieve adequate, but not excessive, steaming. Preferred steaming times range from about 15 to about 30 minutes.

While a major benefit of the invention is that steaming facilitates getting the shells off the cocoa nibs while at the same time "roasting" the beans, nevertheless there are clearly benefits to be had, in terms of removal of off-flavour notes, in subjecting previously shelled cocoa nibs to the steaming process of the invention.

Briefly, it is thought that the steaming process substantially reduces the MIPP content of the beans, while leaving the content of positive flavour note pyrazines reduced by a lesser amount. Thus, off notes in the flavour are reduced, but desirable flavour notes remain. The invention thereby offers the chance to obtain superior quality chocolate from medium quality beans, which is a commercial advantage of major importance.

The inventors have investigated the relationship between off-flavours, steaming treatments and MIPP content, in beans of several different source countries. Briefly, with beans of a more acid flavour, such as are typical of Malaysia, Papua New Guinea and Indonesia, a taste panel is unable to detect a musty off-note in the bean flavour if the content of MIPP is below 3 $\mu$g/Kg. For less acid bean feedstocks, such as from Ivory Coast, MIPP content above about 1.0 $\mu$g/Kg is liable to be detected by a taste panel as a musty off-flavour. As a result it would be desirable to subject the beans to the steam treatment to reduce the MIPP levels to below the aforementioned levels.

Because the loss of desirable pyrazine flavour notes can be confined to acceptably low levels, the steaming process of the present invention can be an acceptable way to do no more than get the shells off the beans. One can therefore specify the steaming process, irrespective whether the beans are mouldy or not, confident that this need not result in loss of flavour of unspoiled beans devoid of negative flavour precursors. Making the process conditions overly aggressive, however, can introduce burnt notes to the flavour. While for some markets this may be desirable, it is usually to be avoided, by limiting the severity of the process conditions.

The apparatus shown in the FIG. 1 comprises a vessel 10 in which may be charged the batch 11 of cocoa beans to be treated. The vessel 10 has a jacket 12 in which oil 13 may be circulated in order to maintain the interior of the vessel 10 at the desired treatment temperature.

Saturated steam 14 is introduced at the base of the treatment vessel 10. The steam 14 comes from a source 15 of water, upstream of a steam generator 16 which produces saturated steam at the flow rates required for the process.

The flow of steam through the vessel exits the vessel at the top end, through a pressure control valve 17. A pressure controller 18 is programmed with the desired pressure profile for the steaming process. It receives from pressure sensor 19 an indication of the instant pressure of steam within the vessel 10, and controls the valve 17 in dependence upon the indicated pressure, in order to maintain the desired pressure profile.

Downstream of the valve 17 is a condenser 20 and a vacuum pump 21 which is used to set the desired steam pressure within the condenser 20. Condensate 22 is further processed in a strip condenser (not shown).

In operation, raw fermented cocoa beans in their shells are charged into the vessel 10, and brought to the pre-selected steaming treatment temperature, using the oil jacket 12 of the vessel to maintain the beans at the treatment temperature. The beans are then steamed, using saturated steam at the pre-selected steaming pressure, which itself sets the temperature of the saturated steam.

After steaming for the pre-selected treatment time, the flow of saturated steam is discontinued, and the steamed beans are removed from the treatment chamber, for further processing.

During the treatment, the flow of steam through the vessel can be adjusted, in order to achieve, by the end of the steaming treatment, the pre-selected steam to bean ratio.

Figure 2:
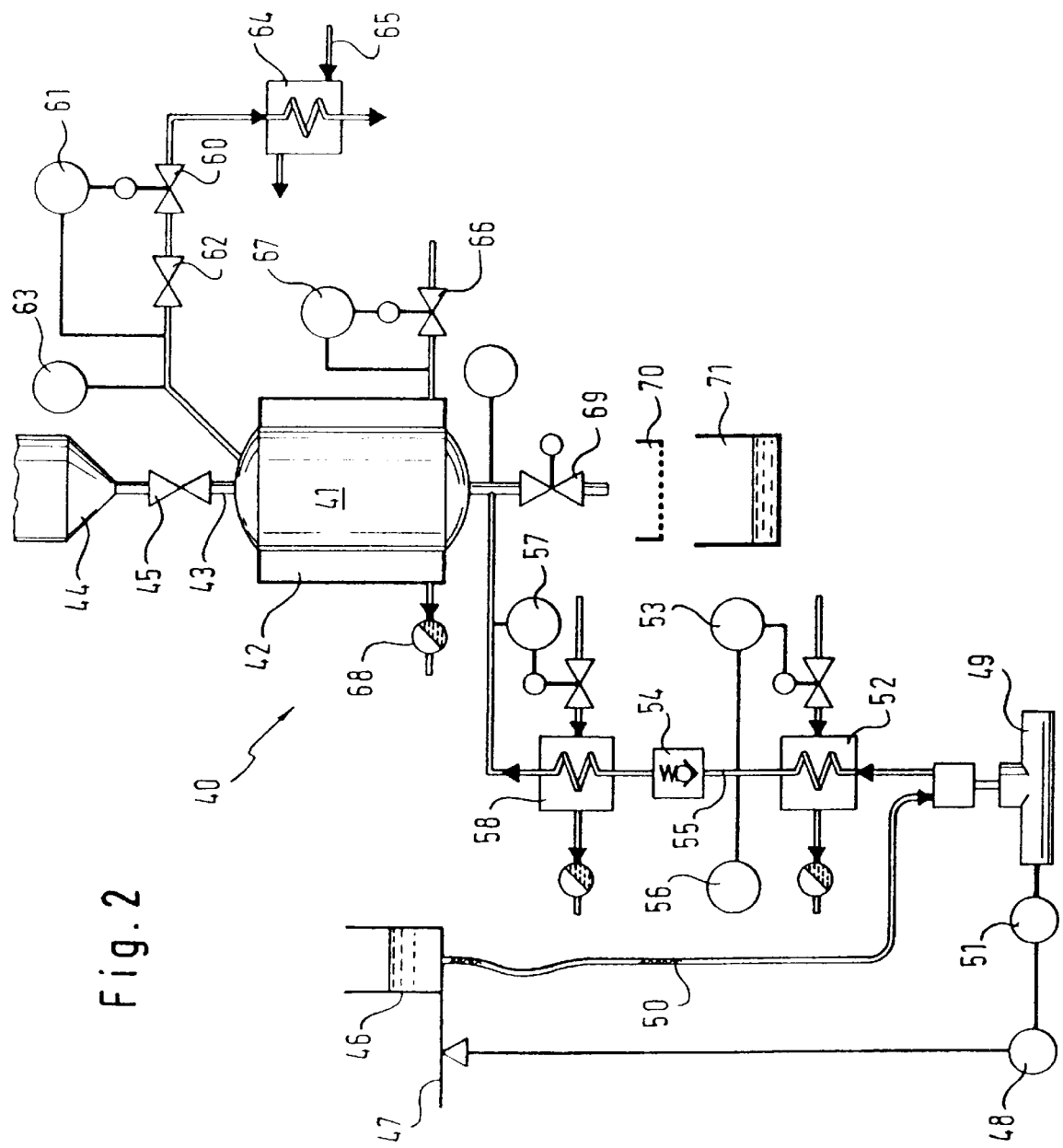
FIG. 2 is a block diagram of a pilot plant for steaminting cocoa beans.

Turning to FIG. 2, the pilot plant 40 is centered on a steaming vessel 41 with a capacity of 20 litre and surrounded by a heating jacket 42. Beans for steaming are charged into the vessel through a conduit 43 from a hopper 44 under the control of a gas-tight ball valve 45. A process water container 46 with 50 litre capacity is mounted on a balance 47 actuated by a flow controller 48 to feed a plunger pump 49 via a flexible hose 50. The pump 49 and flow controller 48 are both under the control of a process controller 51.

From pump 49, water is delivered to a pre-heater 52, in which a temperature controller 53 establishes the desired temperature in the water. A non-return valve 54 in the line 55 downstream of the pre-heater maintains the pressure in the pre-heater as desired, as indicated on a pressure indicator 56. In this way, water at a pre-selected temperature and pressure enters steam producing vessel 58 to produce steam at a temperature controlled by temperature controller 57.

Steam pressure in the process vessel 41 is controlled by a main pressure valve 60, itself controlled by pressure control actuator device 61, and there is also a fine adjustment steam pressure valve 62. A pressure indicator 63 is provided immediately downstream of the process vessel 41. Downstream of the main pressure valve 60, steam is condensed in condenser 64 supplied 65 with cooling waters.

The product to be steamed is also heated in the process vessel by flow of steam through the jacket 42, which is accordingly provided with a steam flow control valve 66, pressure controller 67 and steam trap 68. The process vessel 41 also has a bottom discharge outlet controlled by a pneumatically-operated ball valve. Steamed product is discharged past this valve onto a sieve 70 with a 3 mm mesh opening, below which is a tank 71 to receive any water which drains from the steamed product through the sieve.

In use, the walls of the process vessel 41 are heated by flowing steam through the jacket 42. Typically the walls are maintained at a temperature of 150° C. A first of successive batches of 5 Kg of cocoa beans is charged through the ball valve 45 from the hopper 44 in the process vessel 41. With both ball valves 45, 69 sealed closed, a measured quantity of process water from the tank 46 is pumped through the pre-heater 52 to the steam generator 56 and the resulting steam is flowed through the charge of beans in the process vessel 41. When the specified amount of steam (relative to the mass of beans in vessel 41) has been flowed through the charge of beans, at the pre-selected temperature and pressure, and absorbed by the beans, the action of the pump 49 is suspended, and the charge of steamed beans is allowed to flow out of the vessel 41 by opening the valve 69. The batch of beans can then be charged into the process vessel.

Those parts of the plant which come into contact with product flow are made of stainless steel.

Figure 3:
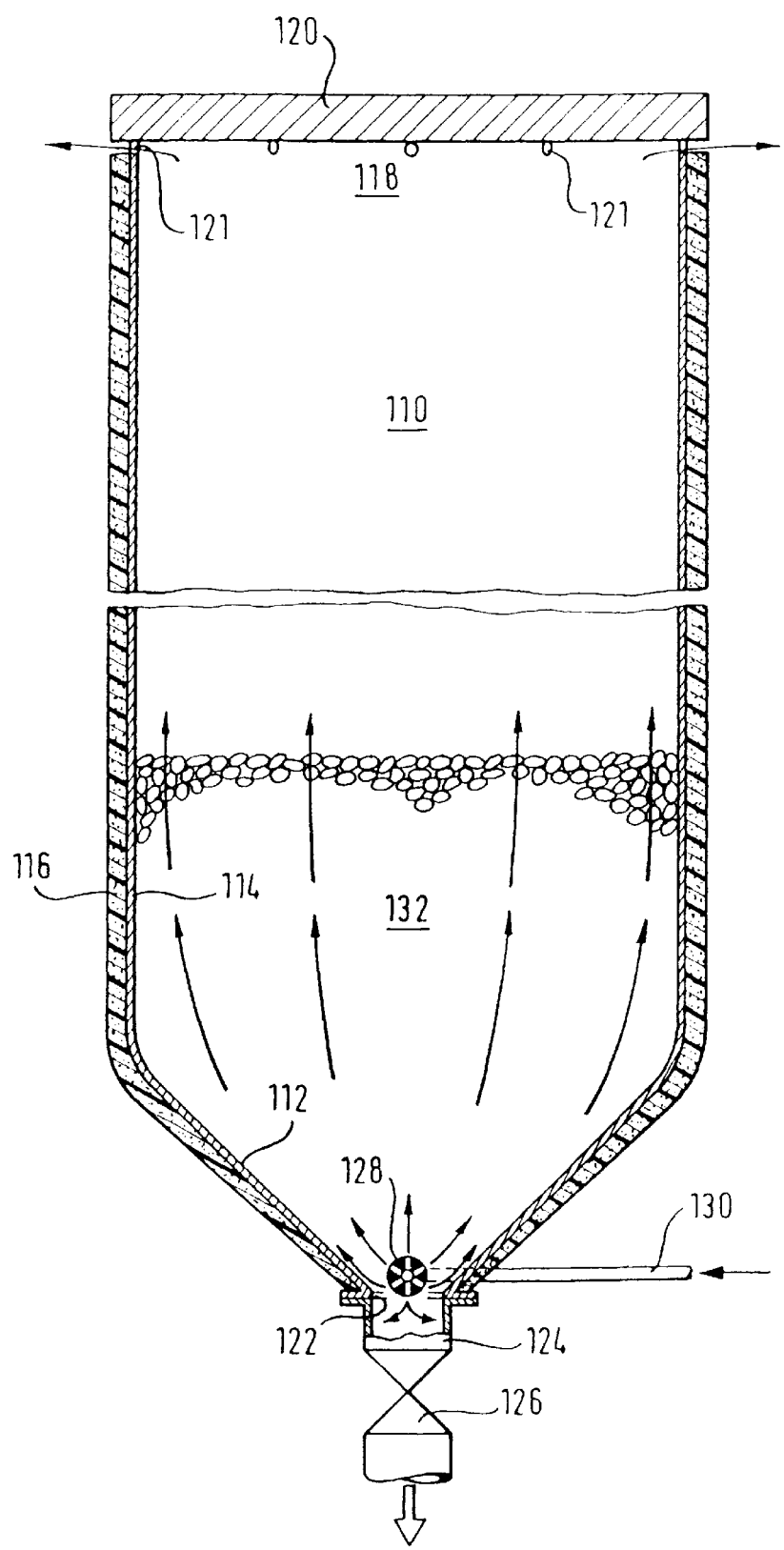
FIG. 3 is a longitudinal diametral section through a steaming vessel of a commercial plant for steaming cocoa beans.

FIG. 3 shows a larger steaming vessel, intended for commercial use, with a capacity of 125 Kg of beans to be steamed in each successive charging of the vessel. The vessel 110 has a conical base 112, a height of just over 4 m and an inside diameter of 0.8 m. Its stainless steel walls 114 are stable under an over-pressure inside the vessel of 1 Mpa (10 bar) and are heat-insulated on the outside with a 10 cm thick cladding 116 of Rockwool®. The open top 118 of the vessel is closed by a large flat cover 120 which can be lifted and moved to the side for charging the vessel. A 10 cm gap 121 between the vessel 110 and its cover 120 when in place is an escape route for the steam which treats the beans in the vessel.

At the vertex 122 of the conical base 112 of the vessel is an outlet aperture 124 controlled by an outlet ball valve 126. Also just above this vertex is a steam inlet dispenser 128 in the form of a stainless steel sphere of diameter 10 cm with a multitude of small holes over its surface, which delivers steam 130 up to a maximum rate which may be of the order of 220 Kg/hr, typically at a pressure of 0.2 Mpa (2 bar) and temperature of 120° C. Typically, the actual temperature within the beans 132 at the end of the steaming treatment is in a range of 103±2° C.

In use, the vessel is pre-heated, using steam throughflow, until the steel walls have attained a temperature of 100° C. Then 125 Kg of cocoa beans is manually charged into the vessel and steaming is commenced at a flow rate of 200 Kg of steam per hour. After around 3 min steam begins to emerge from the top of the vessel. After a total time of 15 minutes of steaming, the temperature of the beans isin a range of from 101 to 105° C. The beans are discharged out of the base of the vessel into containers for transport to a dryer.

The beneficial effects of the steaming process will be evident from the Examples below.

EXAMPLE 1

5 kg raw cocoa beans (Ivory Coast) with a musty off-flavour note were treated in a pressure vessel for 15 minutes with saturated steam at a temperature of 105° C. Steam to bean ratio was 0.8.

Removing the shells was very easy after the treatment. The off-flavour note was completely lost, in the sense that it could no longer be detected by the sensory taste panel. The MIPP content was reduced, as follows:

| MIPP content | unsteamed cocoa | 3.5 µg/kg |
| --- | --- | --- |
| | steamed cocoa | 0.5 µg/kg |
| | MIPP reduction | 3.0 µg/kg (= 86%) |

EXAMPLE 2

The treatment of Example 1 was repeated, on a different 5 kg sample of an Ivory Coast cocoa. Again, the off-note was lost and the MIPP content was reduced, as follows:

| MIPP content | unsteamed cocoa | 2.8 µg/kg |
| --- | --- | --- |
| | steamed cocoa | 0.2 µg/kg |
| | MIPP reduction | 2.6 µg/kg (= 93%) |

EXAMPLE 3

5 kg raw cocoa beans (Ivory Coast) with a musty off-flavour note were treated in a pressure vessel for 30 minutes with saturated steam at a temperature of 105° C. Steam to bean ratio was 0.4.

Removing of the shells was very easy after the treatment. The off-flavour note was completely lost, in the sense that it could no longer be detected by the sensory taste panel.

The MIPP content was reduced, as follows:

| MIPP content | unsteamed cocoa | 3.8 µg/kg |
| --- | --- | --- |
| | steamed cocoa | 0.6 µg/kg |
| | MIPP reduction | 3.2 µg/kg (= 84%) |
| pH increase: | from 5.69 to 5.97 | |

Note: Sensory differences of pH 0+/−0.05 can be tasted.

EXAMPLE 4

5 kg raw cocoa beans (Ivory Coast) with a musty off-flavour note were treated in a pressure vessel for 30 minutes with saturated steam at a temperature of 105° C. Steam to bean ratio was 0.8.

Removing of the shells was very easy after the treatment. The off-flavour note was completely lost, in the sense that it could no longer be detected by the sensory taste panel.

The MIPP content was reduced, as follows:

| MIPP content | unsteamed cocoa | 2.8 µg/kg |
| --- | --- | --- |
| | steamed cocoa | 0.4 µg/kg |
| | MIPP reduction | 2.4 µg/kg (= 86%) |
| pH increase: | from 5.65 to 5.99 | |

EXAMPLE 5

A 5 kg sample of raw Ivory Coast cocoa beans with a musty flavour was treated in a pressure vessel for 15 minutes with saturated steam at 105° C. The steam to bean ratio was 0.4. After treatment, the sensory panel was unable to detect the off-flavour note. A GC-MS analysis indicated a reduction of 95% in MIPP content. Measurement of pH indicated an increase from 5.61 to 5.94. The treatment was found to have produced a milder, less sour flavour in the beans. During the treatment, the beans lost their shells.

EXAMPLE 6

The product of Example 5 was subject to comparative taste and smell testing, relative to a conventionally roasted cocoa bean product, made from fermented cocoa bean feedstock devoid of flavour off-notes. The sensory panel was unable to distinguish the conventional product, made from "good" beans, from the Example 5 product made from beans of "inferior" quality.

EXAMPLE 7

4.5 kg Malaysian cocoa nibs were treated with 3.3 kg saturated steam at 100° C. for 110 min. 84% of the volatile acidity was removed, thus increasing the pH from 5.0 to 5.3. Thus processed, the beans had a considerably milder, nuttier, blander and less sour taste.

EXAMPLE 8

4.5 kg Malaysian cocoa nibs were treated with 4.5 kg saturated steam at 100° C. for 110 minutes. 85% of the volatile acidity was removed, increasing the pH from 5.0 to 5.4. The processed beans had a considerably milder, nuttier, blander and less sour taste.

EXAMPLE 9

2000 Kg of raw Ivory Coast Cocoa beans with a musty off-flavour note were treated in a pressure vessel for 15 minutes with saturated steam at 105° C. and a steam to bean ratio of 0.4. After the steaming treatment, removal of shells from the beans was very easy. The sensory panel could confirm elimination of the off-flavour note. The following results were noted:

Increase in pH: from 5.65 to 6.12

MIPP reduction: 86%, from 3.5 µg/kg to 0.5 µg/kg

EXAMPLE 10

Batches of raw Ivory Coast beans, each 5 Kg, with a musty off-note, were treated with saturated steam for a period of 15 to 30 minutes at a steam to bean ratio of 0.4. Three different treatment temperatures were employed to explore the effect on flavour of changing the steaming temperature. The results were:

| Temperature of Process Steam ° C. | Flavor Notes in Steamed Beans |
|---|---|
| 100 | green, musty taste |
| 120 | satisfactory roasted taste |
| 140 | excessively roasted flavour, intrusion of unwanted process flavours |

We claim:

1. A method for treating cocoa beans to produce roasted, de-shelled cocoa, said method consisting essentially of the following step:

contacting shelled cocoa beans with steam at a temperature within the range of from about 100° C. to about 140° C. for a period of time of from about 10 minutes to about 120 minutes to produce de-shelled, acid-reduced roasted cocoa possessing a decreased level of 2-methoxy-3-isopropylpyrazine (MIPP).

2. A method as claimed in claim 1 wherein the temperature is from about 100° C. to about 130° C.

3. A method as claimed in claim 2 wherein the temperature is from about 100° C. to about 110° C.

4. A method as claimed in claim 1 wherein the steam is substantially saturated steam.

5. A method as claimed in claim 1 wherein the period is from about 15 to about 30 minutes.

6. A method as claimed in claim 1 in which the ratio of weight of steam absorbed by the beans to weight of beans presented for steaming is in a range of about from about 0.1 to about 1.0/1.0.

7. A method as claimed in claim 6 wherein the steam to bean ratio is equal, or approximately equal, to 0.4/1.0.

8. A method as claimed in claim 1 wherein the beans are of Ivory Coast provenance and the method limits the MIPP content throughout the beans to less than about 1.0 µg/Kg.

9. A method as claimed in claim 1 wherein the beans are of Malaysian, Papua New Guinean or Indonesian provenance and the method limits the MIPP content throughout the beans to less than about 3.0 µg/Kg.

10. The method according to claim 1 further comprising the step of manufacture of confectionery chocolate from the steamed cocoa beans.

* * * * *